United States Patent
Arao et al.

(10) Patent No.: US 8,977,329 B1
(45) Date of Patent: Mar. 10, 2015

(54) ELECTRONIC APPARATUS

(71) Applicant: KYOCERA Corporation, Kyoto-shi, Kyoto (JP)

(72) Inventors: Katsumi Arao, Higashiosaka (JP); Akito Iwai, Osaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/337,954

(22) Filed: Jul. 22, 2014

(30) Foreign Application Priority Data

Feb. 26, 2014 (JP) ................................. 2014-034940

(51) Int. Cl.
*H04M 1/00* (2006.01)
*G06F 1/16* (2006.01)
*H04M 1/02* (2006.01)
*H05K 1/00* (2006.01)

(52) U.S. Cl.
CPC ............ *H04B 1/3888* (2013.01); *G06F 1/1605* (2013.01); *G06F 1/1656* (2013.01); *H04M 1/0202* (2013.01)
USPC ........ 455/575.8; 361/776; 361/789; 361/804; 439/66; 439/77

(58) Field of Classification Search
USPC .......... 455/575.8; 361/776, 789, 804; 439/66, 439/77
See application file for complete search history.

(56) References Cited

U.S. PATENT DOCUMENTS

| | | | |
|---|---|---|---|
| 6,317,330 B1 * | 11/2001 | Portman et al. | ................ 361/742 |
| 8,549,737 B2 * | 10/2013 | Pai | ................... 29/829 |
| 2005/0237452 A1 * | 10/2005 | Kojima et al. | ................ 349/113 |
| 2008/0146051 A1 * | 6/2008 | Honda | .............. 439/66 |
| 2013/0236699 A1 | 9/2013 | Prest et al. | |
| 2013/0328792 A1 | 12/2013 | Myers et al. | |
| 2014/0002347 A1 * | 1/2014 | Chen | .............................. 345/156 |
| 2014/0023430 A1 | 1/2014 | Prest et al. | |
| 2014/0030443 A1 | 1/2014 | Prest et al. | |

FOREIGN PATENT DOCUMENTS

| | | |
|---|---|---|
| JP | 1993333164 A | 12/1993 |
| JP | 1993335435 A | 12/1993 |
| JP | 1997008690 A | 1/1997 |
| JP | 2005173393 A | 6/2005 |
| JP | 2008111984 A | 5/2008 |
| JP | 2013-131987 | 7/2013 |
| JP | 2013131987 A | 7/2013 |
| WO | 02054426 A1 | 7/2002 |
| WO | 02054427 A1 | 7/2002 |
| WO | 02054716 A2 | 7/2002 |
| WO | 02054718 A2 | 7/2002 |
| WO | 02054721 A1 | 7/2002 |
| WO | 02054723 A1 | 7/2002 |
| WO | 02054724 A1 | 7/2002 |
| WO | 02054846 A1 | 7/2002 |

* cited by examiner

*Primary Examiner* — Andrew Wendell
*Assistant Examiner* — Maryam Soltanzadeh
(74) *Attorney, Agent, or Firm* — Procopio, Cory, Hargreaves & Savitch LLP

(57) ABSTRACT

A cover panel is disposed on a surface of an electronic apparatus and is made of sapphire. A flexible printed wiring board extends in a state of being curved in the electronic apparatus. A gap reduction member is in contact with at least a curved portion of the flexible printed wiring board from the cover panel side.

20 Claims, 10 Drawing Sheets

US 8,977,329 B1

ELECTRONIC APPARATUS

CROSS-REFERENCE TO RELATED APPLICATIONS

The present application claims priority under 35 USC §119 to Japanese Patent Application No. 2014-34940 filed on Feb. 26, 2014, entitled "Electronic Apparatus", the entirety of which is incorporated herein by reference.

FIELD

The present invention relates to an electronic apparatus, and more particularly to a cover panel of an electronic apparatus.

BACKGROUND

In the related art various techniques are proposed for providing cover panels for displays of electronic devices. These cover panels are subject to breakage and other damage such as cracking and chipping.

SUMMARY

An electronic apparatus includes a cover panel that is made of sapphire. A cable is provided in the electronic apparatus that forms a curved portion. A gap reduction member is in contact with at least a portion of the curved portion of the cable from the panel side.

The sapphire panel and gap reduction member provide a resistance to breakage.

DETAILED DESCRIPTION

External Appearance of Electronic Apparatus

Figure 1:
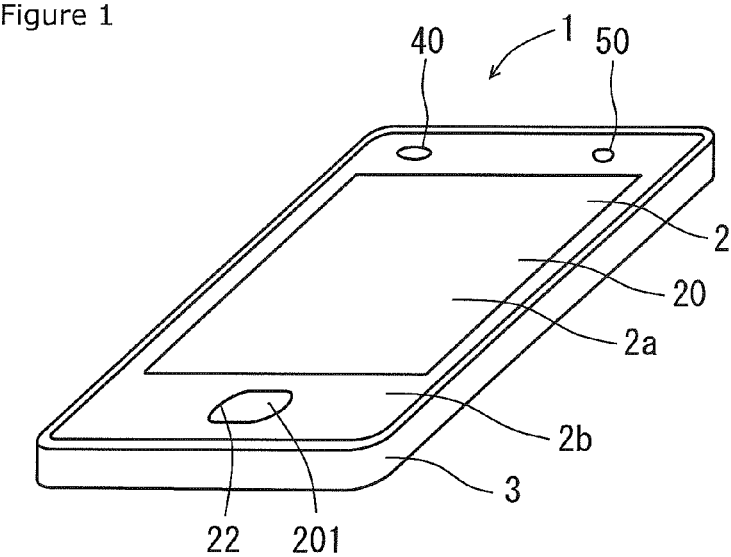
FIG. 1 is a perspective view illustrating an example of an external appearance of an electronic apparatus.
Figure 2:
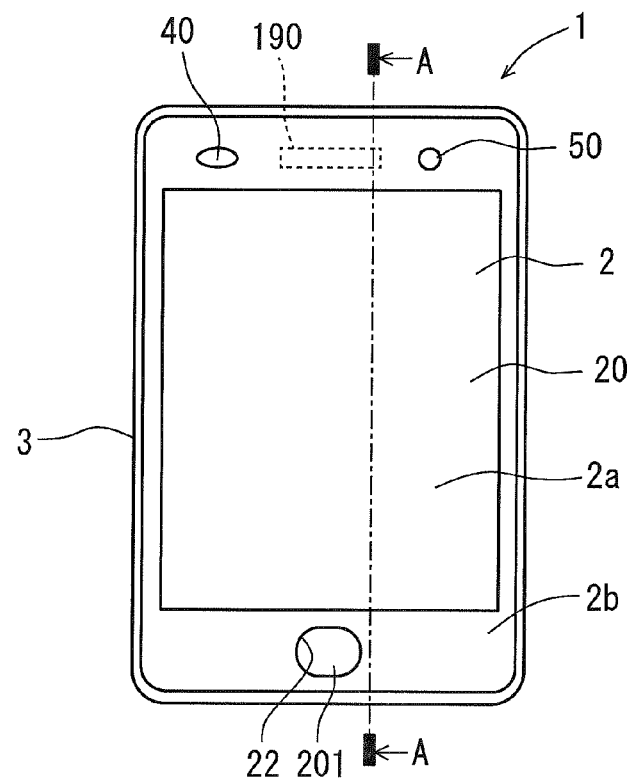
FIG. 2 is a front surface view illustrating an example of an external appearance of an electronic apparatus.
Figure 3:
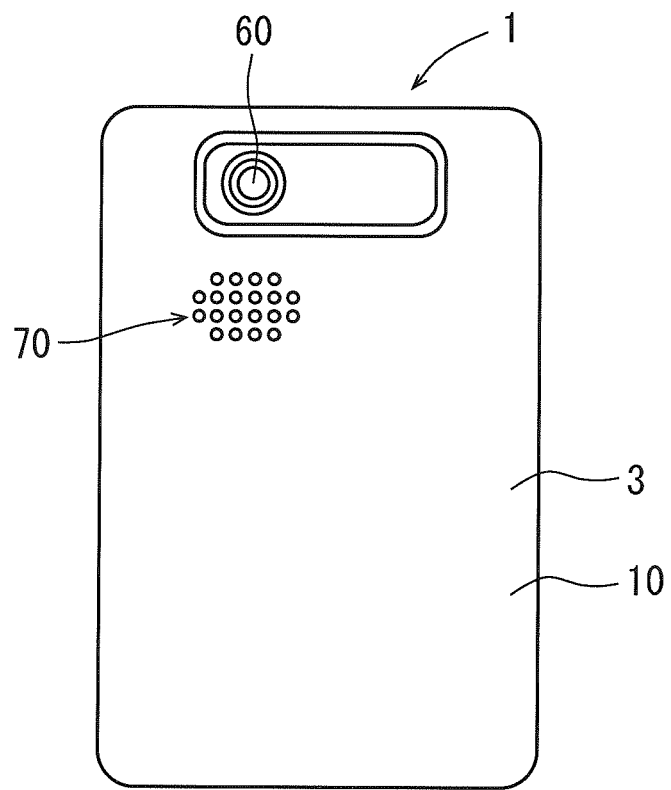
FIG. 3 is a rear surface view illustrating an example of an external appearance of an electronic apparatus.
Figure 4:
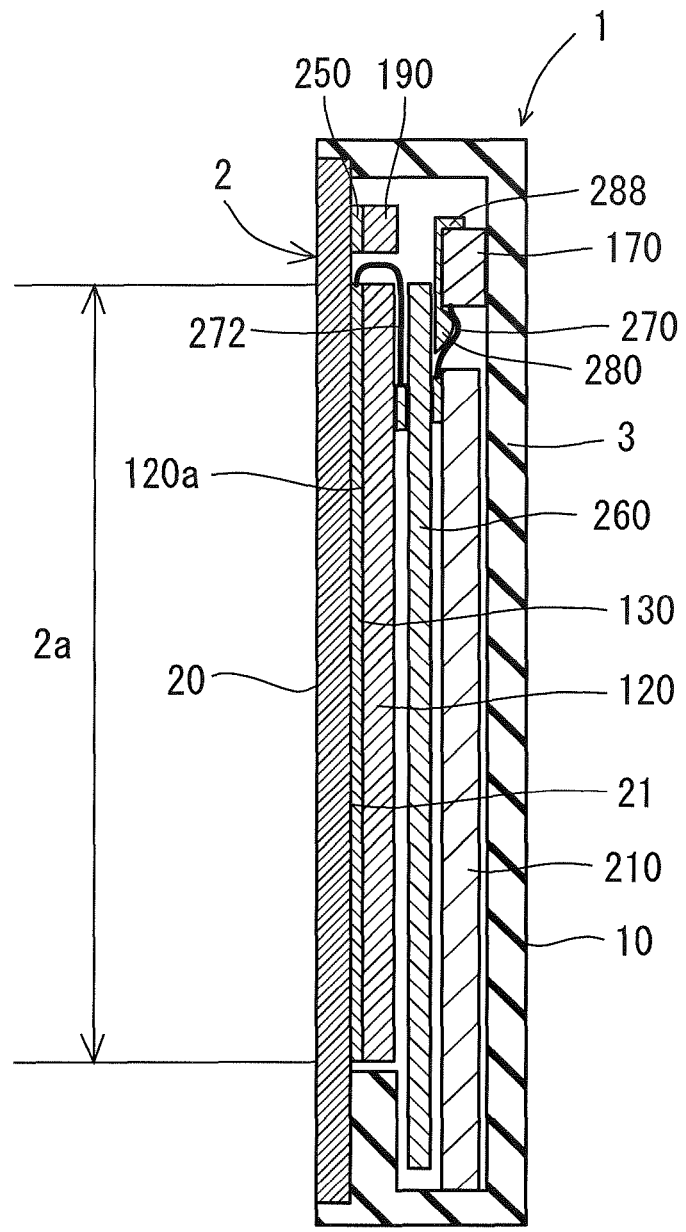
FIG. 4 is a view illustrating an example cross-sectional structure of an electronic apparatus.
Figure 5:
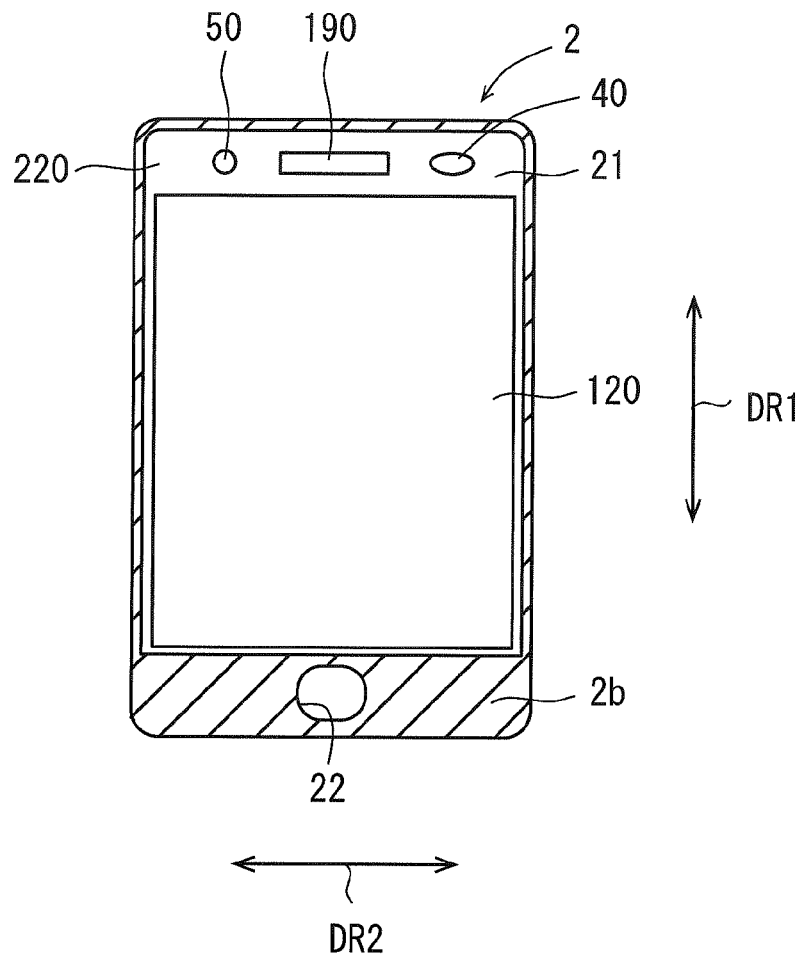
FIG. 5 is an example of a plan view of a cover panel when seen from an inner surface side of an electronic apparatus.

FIGS. 1, 2 and 3 are examples of a perspective view, a front surface view, and a rear surface view, respectively, illustrating an external appearance of an electronic apparatus 1. FIG. 4 is a view schematically illustrating a cross-sectional structure along line A-A of the electronic apparatus 1 illustrated in FIG. 2. FIG. 5 is a rear surface view of a cover panel 2 included in the electronic apparatus 1. A piezoelectric vibrating element 190 and a display panel 120 included in the electronic apparatus 1 are installed on the cover panel 2 illustrated in FIG. 5. The electronic apparatus 1 is, for example, a mobile phone such as a smart phone.

As illustrated in FIGS. 1 to 4, the shape of the electronic apparatus 1 is approximately a rectangular plate shape in a plan view. The electronic apparatus 1 includes a transparent, and or light transmissive, cover panel 2 which covers a display surface 120a (see FIG. 4) of the display panel 120 and a case 3 which supports the cover panel 2.

The cover panel 2 is disposed on the surface of the electronic apparatus 1, specifically, on the front surface of the electronic apparatus 1. The cover panel 2 is arranged on a portion other than an edge area, for example a peripheral edge, of the front surface of the electronic apparatus 1.

The cover panel 2 has, for example, a plate shape, and an approximately rectangular shape in a plan view. The cover panel 2 includes a first surface 20 constituting a portion of the front surface of the electronic apparatus 1 and a second surface 21 that is positioned on the opposite side to the first surface 20 and faces the display surface 120a of the display panel 120. Hereinafter, the first surface 20 is also referred to as an "outer surface 20" and the second surface 21 is also referred to as an "inner surface 21." The cover panel 2 may be a plane panel having a planar shape or a curved panel having a curved shape.

The cover panel 2 is made of, for example, sapphire. That is, the cover panel 2 is a panel of a one-layer structure having a layer made of sapphire which is disposed on the surface of the electronic apparatus 1. Here, sapphire refers to a single crystal containing alumina ($Al_2O_3$) as a main component, and a single crystal whose purity of $Al_2O_3$ is approximately greater than or equal to 90% in the present specification. The purity of $Al_2O_3$ is preferably greater than or equal to 99% which provides a resistance to damage of the cover panel and a reduction of cracks or chipping.

In an embodiment, the cover panel 2 is a panel of a one-layer structure having a layer made of sapphire which is disposed on the surface of the electronic apparatus 1. However, the cover panel 2 may be a composite panel (laminated panel) of a multilayer structure having such a layer. For example, the cover panel 2 may be a composite panel of a two-layered structure configured of a first layer (sapphire panel) made of sapphire which is disposed on the surface of the electronic apparatus 1 and a second layer (glass panel) made of glass which is attached to the first layer. In addition, the cover panel 2 may be a composite panel of a three-layered structure configured of a layer (sapphire panel) made of sapphire which is disposed on the surface of the electronic apparatus 1, a layer (glass panel) made of glass which is attached to the layer made of sapphire, and a layer (sapphire panel) made of sapphire which is attached to the layer made of glass. Further, the cover panel 2 may include a layer made of crystalline materials other than sapphire such as diamond, zirconia, titania, crystal, lithium tantalite, and aluminum oxynitride.

The cover panel 2 includes a transparent and/or light transmissive display portion 2a (also referred to as a display window) transmitting the display of the display panel 120. The display portion 2a has, for example, a rectangular shape in a plan view. The visible light output from the display panel 120 passes through the display portion 2a and is emitted to the outside of the electronic apparatus 1. A user visually recognizes information displayed on the display panel 120 through the display portion 2a from the outside of the electronic apparatus 1.

A portion of a peripheral end 2b that surrounds the display portion 2a in the cover panel 2 is black because of, for example, a film that is attached thereto. Accordingly, the portion of the peripheral end 2b is a non-display portion that does not transmit the display of the display panel 120.

The case 3 has an approximately square shape with one surface that is partially opened. The case 3 of the electronic apparatus 1 includes a peripheral end of a front surface, a side surface, and a rear surface. The case 3 is formed of, for example, at least one of a resin and a metal. The resin forming the case 3 may be, for example, a polycarbonate resin, an acrylonitrile butadiene styrene (ABS) resin, or a nylon-based resin. A metal forming the case 3 may be, for example, aluminum. The case 3 may be configured of only one material or a combination of materials.

As illustrated in FIG. 4, a touch panel 130 is attached to the inner surface 21 of the cover panel 2. The display panel 120, which is a display unit, is attached to the surface on the opposite side to the inner surface 21 of the touch panel 130. That is, the display panel 120 is installed on the inner surface 21 of the cover panel 2 with the touch panel 130 therebetween. A portion of the cover panel 2 facing the display panel 120 becomes the display portion 2a. The user can provide various instructions with respect to the electronic apparatus 1 by operating the display portion 2a of the cover panel 2 using a finger or the like.

A printed board 260 on which various components such as a CPU 101, a DSP 102, and the like described below are mounted is disposed in the inside of the case 3. The printed board 260 is disposed between a rear surface 10 side of the electronic apparatus 1 and the display panel 120.

An operation unit 200, described below and illustrated in FIG. 6, includes an operation button 201 that is disposed in the inside of the case 3. The surface of the operation button 201 is exposed from the lower end of the outer surface 20 of the cover panel 2. A hole (for example, a through-hole) 22 that penetrates the cover panel 2 in the thickness direction thereof is configured at the lower end of the cover panel 2. The hole 22 is configured at the central portion in the lateral direction in the lower end of the cover panel 2. The operation button 201 is exposed from the hole 22. Although one operation button 201 is shown disposed with respect to the operation unit 200, a plurality of the operation buttons 201 exposed from the cover panel 2 may be provided. The operation button 201 may be, for example, glass or resin. Other materials that may be used for the operation button 201 include crystalline materials such as sapphire, diamond, zirconia, titania, crystal, lithium tantalate, and aluminum oxynitride. Further, the operation button 201 may not be provided. In this case, the hole 22 is not necessary in the cover panel 2 and no hole is formed on the cover panel 2.

Figure 6:
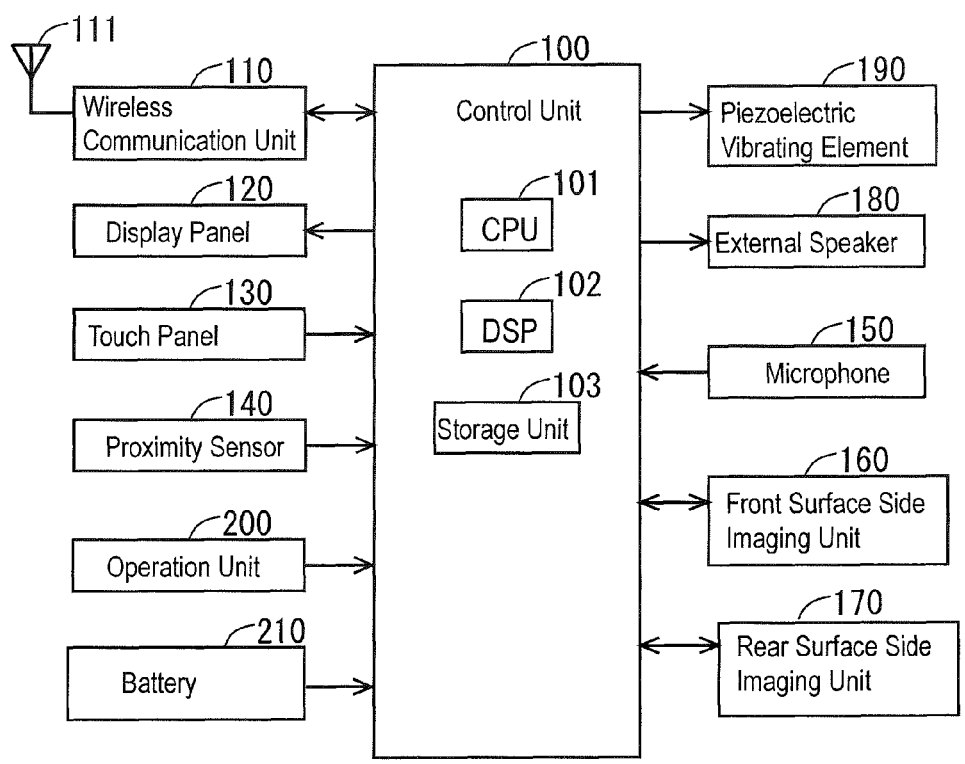
FIG. 6 is a view illustrating an example of an electrical configuration of an electronic apparatus.

As illustrated in FIG. 4 and FIG. 6, a proximity sensor 140, a front imaging unit 160, a rear imaging unit 170, and a piezoelectric vibrating element 190 are disposed in the inside of the case 3. As illustrated in FIG. 4, the piezoelectric vibrating element 190 is attached to the inner surface 21 of the cover panel 2 by an attaching member 250. For example, a double-sided tape or an adhesive may be adopted as an attaching member 250.

A first transparent portion 40 for visual recognition of the proximity sensor 140 is disposed in the upper end of the cover panel 2. A second transparent portion 50 for visual recognition of an imaging lens is included in the front imaging unit 160, and is disposed on the upper end of the cover panel 2.

As illustrated in FIG. 3, a third transparent portion 60 for visual recognition of the imaging lens is included in the rear imaging unit 170 is disposed on the rear surface 10 of the electronic apparatus 1. Speaker holes 70 are formed on the rear surface 10 of the electronic apparatus 1.

The cover panel 2 is attached to the case 3 by an attaching member. Specifically, the inner surface 21 of the cover panel 2 is attached to the case 3 through the attaching member. In this manner, the inner surface 21 of the cover panel 2 is supported by the case 3.

In FIG. 5, an area attached to the case 3 by the attaching member on the inner surface 21 of the cover panel 2 is indicated by oblique lines. As illustrated in FIG. 1 and FIG. 5, the case 3 is attached to the peripheral edge on the inner surface 21 of the cover panel 2 such that the case 3 surrounds the entire circumference of the display portion 2a of the cover panel 2. That is, the case 3 supports the peripheral edge on the inner surface 21 of the cover panel 2 such that the case 3 surrounds the circumference of the display portion 2a of the cover panel 2.

In the upper end on the inner surface 21 of the cover panel 2, a portion on the upper side (outer side) of the first transparent portion 40 and the second transparent portion 50 is attached to the case 3. In the lower end on the inner surface 21 of the cover panel 2, a large part of the area on the lower side of the display portion 2a is attached to the case 3.

As illustrated in FIG. 4, the display panel 120 and the touch panel 130 are respectively connected to, for example, the printed board 260 through the flexible printed wiring board (hereinafter, referred to as a flexible printed board) 272. A control unit 100 described below is disposed on the printed board 260 and the control unit 100 has a function of controlling the display panel 120 and the touch panel 130. One flexible printed board 272 is illustrated in FIG. 4, but a flexible printed board for connecting the display panel 120 with the printed board 260 and a flexible printed board for connecting the touch panel 130 with the printed board 260 may be separately disposed. The touch panel 130 detects a position of an operator, such as a finger or the like of the user, in the display portion 2a, and outputs the detected position to the control unit 100.

In FIG. 4, the rear imaging unit 170 is connected to the printed board 260 through a flexible printed board 270. The control unit 100 described below which is disposed on the printed board 260 has a function of controlling the rear imaging unit 170. The rear imaging unit 170 performs imaging by control of the control unit 100, and outputs data of the imaged image to the control unit 100.

In FIG. 4, the battery 210 has a plate shape. The battery 210 is disposed on the rear surface 10 side of the electronic apparatus 1 and faces the printed board 260. The battery 210 is disposed on the lower side of the rear imaging unit 170.

Further, in an example, as illustrated in FIG. 4, a gap reduction member 280 is provided in the inside of the electronic apparatus 1. The gap reduction member 280 is described below.

<Electrical Configuration of Electronic Apparatus>

FIG. 6 is a block diagram mainly illustrating the electrical configuration of an electronic apparatus 1. As illustrated in FIG. 6, the electronic apparatus 1 includes the control unit 100, a wireless communication unit 110, the display panel 120, the touch panel 130, the proximity sensor 140, and a microphone 150. Further, the electronic apparatus 1 includes a front imaging unit 160, a rear imaging unit 170, an external speaker 180, a piezoelectric vibrating element 190, an operation unit 200, and a battery 210. These elements are accommodated in the case 3.

The control unit 100 includes a Central Processing Unit (CPU) 101, a Digital Signal Processor (DSP) 102, and a storage unit 103. The control unit 100 manages the overall operation of the electronic apparatus 1 by controlling other elements of the electronic apparatus 1.

The storage unit 103 is a recording medium which is non-transitory and is readable by the control unit 100 (CPU) 101 and Digital Signal Processor (DSP) 102 such as a Read Only Memory (ROM) and a Random Access Memory (RAM). A main program, a plurality of application programs, and the like, which are control programs for controlling the electronic apparatus 1, specifically, for controlling respective elements such as the wireless communication unit 110, the display panel 120, and the like, are stored in the storage unit 103. Various functions of the control unit 100 can be realized by the CPU 101 and the DSP 102 executing various programs in the storage unit 103.

Further, in addition to the ROM and the RAM, the storage unit 103 may include a non-transitory recording medium which is readable by a computer. The storage unit 103 may include a compact hard disk drive and a Solid State Drive (SSD).

The wireless communication unit 110 includes an antenna 111. In the wireless communication unit 110, the antenna 111 receives a signal from a mobile phone different from the electronic apparatus 1, or from a communication device such as a web server connected to the Internet via a base station. The wireless communication unit 110 performs an amplification process and down conversion on the received signal and outputs the signal to the control unit 100. The control unit 100 performs demodulation processing or the like on the received signal, and acquires a sound signal (sound information) indicating a voice or music included in the received signal.

Further, the wireless communication unit 110 performs up-converting and an amplification process on a transmission signal, which may include a sound signal or the like, generated in the control unit 100, and transmits the transmission signal through the antenna 111 in a wireless manner. The transmission signal from the antenna 111 is received by a communication device connected to the Internet, or is received by a mobile phone different from the electronic apparatus 1 via a base station.

The display panel 120 is, for example, a liquid crystal display panel or an organic electro luminescent (EL) panel. The display panel 120 displays various pieces of information such as characters, symbols, and figures by control of the control unit 100. The information displayed in the display panel 120 can be visually recognized by the user of the electronic apparatus 1 through the display portion 2a of the cover panel 2.

The touch panel 130 is, for example, a projection type electrostatic capacitance touch panel in a form of a sheet. The touch panel 130 detects contact of an object with respect to the display portion 2a of the cover panel 2, and outputs a detection signal according to the detected contact. The touch panel 130 is attached to the inner surface 21 of the cover panel 2. The control unit 100 specifies the contents of an operation performed on the display portion 2a of the cover panel 2 based on the detection signal output from the touch panel 130, and performs an operation according to the specified contents.

The proximity sensor 140 is, for example, an infrared type proximity sensor. The proximity sensor 140 outputs a detection signal when an object approaches the proximity sensor 140 within a predetermined distance. The detection signal is input to the control unit 100. When the control unit 100 receives the detection signal from the proximity sensor 140, for example, the control unit 100 stops a function of detecting an operation of the touch panel 130.

The front imaging unit 160 includes an imaging lens, an imaging element, and the like. The front imaging unit 160 images a still image and a moving image based on the control by the control unit 100. The imaging lens of the front imaging unit 160 can be visually recognized from the second transparent portion 50 on the front surface of the electronic apparatus 1. Therefore, the front imaging unit 160 can image an object in front of the surface side (cover panel 2 side) of the electronic apparatus 1.

The rear surface imaging unit 170 includes an imaging lens, an imaging element, and the like. The rear imaging unit 170 images a still image and a moving image based on the control by the control unit 100. The imaging lens of the rear imaging unit 170 can be recognized from the third transparent portion 60 on the rear surface of the electronic apparatus 1. Therefore, the rear surface 10 side imaging unit 170 can image an object in front of the rear surface 10 side of the electronic apparatus 1.

The microphone 150 outputs a sound from the outside of the electronic apparatus 1 to the control unit 100 by converting the sound into an electric sound signal. The sound from the outside of the electronic apparatus 1 is received by the microphone 150 through microphone holes (not illustrated) configured on the surface of the electronic apparatus 1.

The external speaker 180 is, for example, a dynamic speaker. The external speaker 180 converts the electric sound signal from the control unit 100 into a sound and then outputs the sound. The sound output from the external speaker 180 is output from the speaker holes 70 configured on the rear surface 10 of the electronic apparatus 1. The volume of the sound output from the speaker holes 70 is set to a degree such that the sound can be heard at a location separated from the electronic apparatus 1.

As illustrated in FIG. 4 and FIG. 6, the piezoelectric vibrating element 190 is attached to the inner surface 21 of the cover panel 2 disposed on the front surface of the electronic apparatus 1 by an attaching member 250 as described above. The piezoelectric vibrating element 190 is vibrated by a driving voltage applied from the control unit 100. The control unit 100 generates a driving voltage based on a sound signal and applies the driving voltage to the piezoelectric vibrating element 190. The cover panel 2 is vibrated by the piezoelectric vibrating element 190 which vibrates based on the driving voltage from the control unit 100. As a result, a reception sound is transmitted to the user from the cover panel 2. The volume of the reception sound is set to a degree such that the user can appropriately hear the sound when the cover panel 2 is set close against an ear of the user.

The operation unit 200 includes an operation button 201 and a switch, and detects an operation with respect to the operation button 201. The switch turns on when the operation button 201 is pressed (operated). The operation unit 200 outputs an ON signal, indicating that the operation button 201 is operated, to the control unit 100 when the switch is turned on. In contrast, the operation unit 200 outputs an OFF signal, indicating that the operation button 201 is not operated, to the control unit 100 when the operation button 201 has not operated for a predetermined time and the switch is turned OFF. The control unit 100 determines whether the operation button 201 is operated or not based on the ON signal and the OFF signal input from the operation unit 200, and performs an operation according to the determination result.

The battery 210 outputs a power source for use by the electronic apparatus 1. The power source output from the battery 210 is supplied to respective electronic components contained in the control unit 100 or the wireless communication unit 110 included in the electronic apparatus 1.

<Details of Piezoelectric Vibrating Element>

Figure 7:
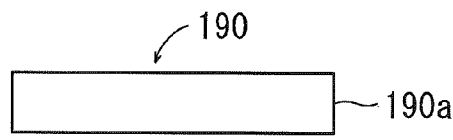
FIG. 7 is a top view illustrating an example of a configuration of a piezoelectric vibrating element.
Figure 8:
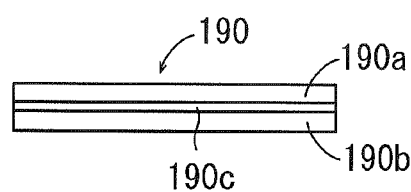
FIG. 8 is a side surface view illustrating an example of a configuration of a piezoelectric vibrating element.

FIGS. 7 and 8 illustrate a top view and a side view, respectively, of a structure of the piezoelectric vibrating element 190. As illustrated in FIGS. 7 and 8, the piezoelectric vibrating element 190 has a long shape in one direction. Specifically, the piezoelectric vibrating element 190 has a long and narrow rectangular plate shape in a plan view. The piezoelectric vibrating element 190 has, for example, a bimorph structure. The piezoelectric vibrating element 190 includes a first piezoelectric ceramic plate 190*a* and a second piezoelectric ceramic plate 190*b* which are bonded to each other through a shim material 190*c*.

In the piezoelectric vibrating element 190, when a positive voltage is applied to the first piezoelectric ceramic plate 190*a* and a negative voltage is applied to the second piezoelectric ceramic plate 190*b*, the first piezoelectric ceramic plate 190*a* extends along the longitudinal direction and the second piezoelectric ceramic plate 190*b* contracts along the longitudinal direction. Accordingly, as illustrated in FIG. 9, the piezoelectric vibrating element 190 is bent into a convex shape with the first piezoelectric ceramic plate 190*a* being outside.

In contrast, in the piezoelectric vibrating element 190, when a negative voltage is applied to the first piezoelectric ceramic plate 190*a* and a positive voltage is applied to the second piezoelectric ceramic plate 190*b*, the first piezoelectric ceramic plate 190*a* contracts along the longitudinal direction and the second piezoelectric ceramic plate 190*b* extends along the longitudinal direction. Accordingly, as illustrated in FIG. 10, the piezoelectric vibrating element 190 is bent into a convex shape with the second piezoelectric ceramic plate 190*b* being outside.

Figure 9:
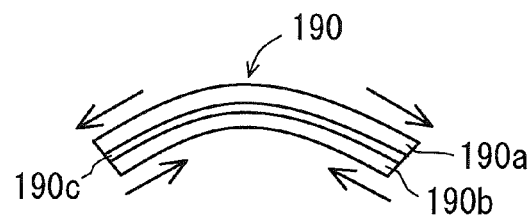
FIG. 9 is a view illustrating an example of a state of a piezoelectric vibrating element.
Figure 10:
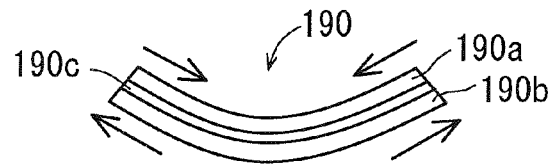
FIG. 10 is a view illustrating an example of the state of a piezoelectric vibrating element.

The piezoelectric vibrating element 190 vibrates while being bent along the longitudinal direction by alternatively taking the state of FIG. 9 and FIG. 10. The control unit 100 allows the piezoelectric vibrating element 190 to vibrate while being bent along the longitudinal direction by applying an alternating current (AC) voltage in which the positive voltage and the negative voltage alternatively appear at an area between the first piezoelectric ceramic plate 190*a* and the second piezoelectric ceramic plate 190*b*.

Only one structure made of the first piezoelectric ceramic plate 190*a* and the second piezoelectric ceramic plate 190*b*, which are bonded to each other by interposing the shim material 190*c* therebetween, is provided in the piezoelectric vibrating element 190 illustrated in FIGS. 7 to 10. However, a plurality of the structures may be laminated to each other.

The piezoelectric vibrating element 190 having such a structure is disposed on the peripheral end of the inner surface 21 of the cover panel 2, as illustrated in FIG. 5. Specifically, the piezoelectric vibrating element 190 is disposed in a central portion in a short-length direction DR2 in the upper end of the inner surface 21 of the cover panel 2. The longitudinal direction of the piezoelectric vibrating element 190 is disposed along the short-length direction DR2 of the cover panel 2. In this manner, the piezoelectric vibrating element 190 vibrates while being bent along the short-length direction DR2 of the cover panel 2. Further, the center of the longitudinal direction of the piezoelectric vibrating element 190 corresponds to the center of the short-length direction DR2 in the upper end of the inner surface 21 of the cover panel 2.

As illustrated in FIGS. 9 and 10, the center of the longitudinal direction of the piezoelectric vibrating element 190 has the largest displacement amount when the piezoelectric vibrating element 190 is vibrating. Accordingly, an area in the center of the short-length direction DR2 in the upper end of the inner surface 21 of the cover panel 2, that corresponds to the position of the piezoelectric vibrating element, has the largest displacement amount of bending and vibrating.

As illustrated in FIG. 5, a partial area 220 in the upper end of the cover panel 2, on which the front surface side of the case 3 and the display panel 120 are not mounted, has a long shape along the short-length direction DR2 of the cover panel 2. Therefore, the partial area 220 is easily bent along the short-length direction DR2 compared to the longitudinal direction DR1 because of the shape thereof. Since the longitudinal direction (direction of the piezoelectric vibrating element vibrating while being bent) of the piezoelectric vibrating element 190 is disposed in the partial area 220 along the longitudinal direction of the partial area 220, the partial area 220 easily vibrates. Therefore, the reception sound becomes easily transmitted to the user from the cover panel 2.

As illustrated in FIG. 7 to FIG. 10, only one structure made of the first piezoelectric ceramic plate 190*a* and the second piezoelectric ceramic plate 190*b*, which are bonded to each other by interposing the shim material 190*c* therebetween, is provided in the piezoelectric vibrating element 190. However, a plurality of the structures may be laminated to each other. For example, twenty-eight or more layers that are laminated provide an increased level of vibration that can be transmitted to the cover panel 2. Accordingly forty-four or more layers that are laminated provide an increased sufficiency in the vibration that can be transmitted to the cover panel 2.

Further, the piezoelectric vibrating element 190 may be made of organic piezoelectric materials such as polyvinylidene fluoride and polylactic acid in addition to the piezoelectric ceramic materials. For example, the piezoelectric vibrating element 190 is configured such that films made of polylactic acid are used as a first piezoelectric plate and a second piezoelectric plate and they are laminated to each other. In addition, in regard to an electrode, a transparent electrode such as Indium-Tin-Oxide (that is, indium tin oxide, ITO) is possible to be used.

<Regarding Generation of Reception Sound>

In the electronic apparatus 1, an air conduction sound and a conduction sound are transmitted to the user by the piezoelectric vibrating element 190 through the cover panel 2 which is vibrated by the piezoelectric vibrating element 190. That is, the vibration of the piezoelectric vibrating element 190 is transmitted to the cover panel 2 so that the air conduction sound and the conduction sound are transmitted to the user from the cover panel 2.

Here, the term "air conduction sound" means a sound recognized in a human brain by the vibration of an eardrum due to a sound wave (air vibration) which enters an external auditory meatus hole (a so-called "ear hole"). On the other hand, the term "conduction sound" is a sound recognized in a human brain by the vibration of the eardrum due to the vibration of an auricle transmitted to the eardrum. Hereinafter, the air conduction sound and the conduction sound will be described in detail.

Figure 11:
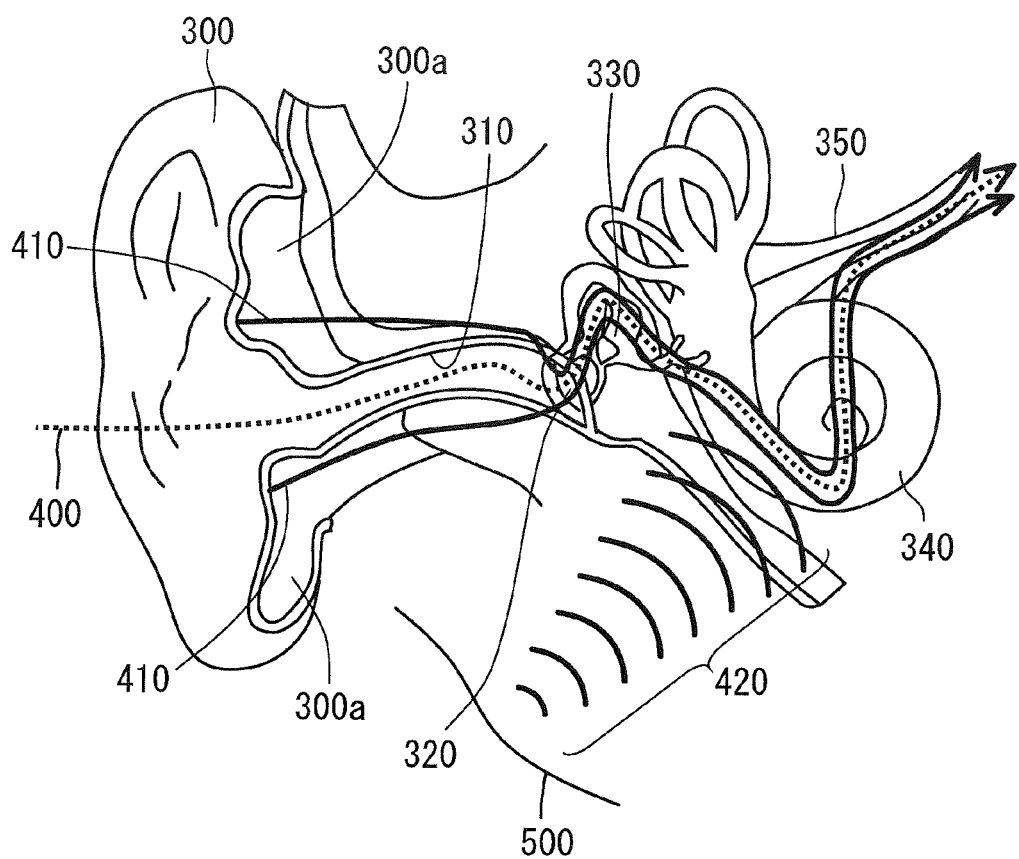
FIG. 11 is a view for describing an example of an air conduction sound and a conduction sound.

FIG. 11 is a view for describing the air conduction sound and the conduction sound. FIG. 11 illustrates a structure of an ear of the user of the electronic apparatus 1. In FIG. 11, a dotted line 400 indicates a conduction path of a sound signal (sound information) of the air conduction sound. A solid line 410 indicates the conduction path of the sound signal of the conduction sound.

When the piezoelectric vibrating element 190 mounted on the cover panel 2 vibrates based on the electric sound signal indicating the reception sound, the cover panel 2 vibrates, and a sound wave is output from the cover panel 2. When the user moves the cover panel 2 of the electronic apparatus 1 close to an auricle 300 of the user by holding the electronic apparatus 1 in a hand, or the cover panel 2 of the electronic apparatus 1 is set to (brought into contact with) the auricle 300 of the user, the sound wave output from the cover panel 2 enters an external auditory meatus hole 310. The sound wave from the cover panel 2 enters in the external auditory meatus hole 310 and the eardrum 320, and the eardrum 320 vibrates. The vibration of the eardrum 320 is transmitted to an auditory ossicle 330 and the auditory ossicle 330 vibrates. In addition, the vibration of the auditory ossicle 330 is transmitted to a cochlea 340 and is converted into an electrical signal in the cochlea 340. The electrical signal is transmitted to the brain by passing through an acoustic nerve 350 and the reception sound is recognized in the brain. In this manner, the air conduction sound is transmitted from the cover panel 2 to the user.

Further, when the user puts the cover panel 2 of the electronic apparatus 1 to the auricle 300 of the user by holding the electronic apparatus 1 in a hand, the auricle 300 is vibrated by the cover panel 2, which cover panel 2 is vibrated by the piezoelectric vibrating element 190. The vibration of the auricle 300 is transmitted to the eardrum 320, and thus the eardrum 320 vibrates. The vibration of the eardrum 320 is transmitted to the auditory ossicle 330, and thus the auditory ossicle 330 vibrates. The vibration of the auditory ossicle 330 is transmitted to the cochlea 340 and is converted into an electrical signal in the cochlea 340. The electrical signal is transmitted to the brain by passing through the acoustic nerve 350 and the reception sound is recognized in the brain. In this manner, the conduction sound is transmitted from the cover panel 2 to the user. FIG. 11 illustrates an auricular cartilage 300a in the inside of the auricle 300.

Bone conduction sound is a sound recognized in a human brain by the vibration of the skull and direct stimulation of the inner ear such as the cochlea caused by the vibration of the skull. In FIG. 11, in a case of vibrating the jawbone 500, the transmission path of the sound signal while the bone conduction sound is recognized in the brain is indicated with a plurality of arcs 420.

As described above, the air conduction sound and the conduction sound can be transmitted from the cover panel 2 to the user of the electronic apparatus 1 due to the vibration of the cover panel 2 through the vibration of the piezoelectric vibrating element 190. The user can hear the air conduction sound from the cover panel 2 by moving the cover panel 2 close to an ear (auricle). Further, the user can hear the air conduction sound and the conduction sound from the cover panel 2 by bringing the cover panel 2 into contact with an ear (auricle).

Since the user can hear a sound when the user puts the cover panel 2 to an ear, communication using the electronic apparatus 1 can be performed without much concerning regarding the position of the electronic apparatus 1 with respect to the ear.

In addition, since the user can hear the conduction sound due to the vibration of the auricle, it easy for the user to hear the sound even when there is a large amount of ambient noise. Accordingly, the user can appropriately perform communication even when there is a large amount of the ambient noise.

In addition, even in a state in which earplugs or earphones are fixed to the ears of the user, the reception sound from the electronic apparatus 1 can be recognized by setting the cover panel 2 to the auricle. Further, even in the state in which headphones are fixed to the ears of the user, the reception sound from the electronic apparatus 1 can be recognized by putting the cover panel 2 to the headphones.

The sound from the cover panel 2 becomes easy to hear when the user moves the upper end of the cover panel 2 (particularly, the central portion of the upper end in the short-length direction DR2 which corresponds to the placement of the piezoelectric vibrating element 190) close to an ear, or puts the upper end thereof to an ear.

In another example, a general dynamic receiver may be provided instead of or in addition to the piezoelectric vibrating element 190.

<Gap Reduction Member>

Figure 12:
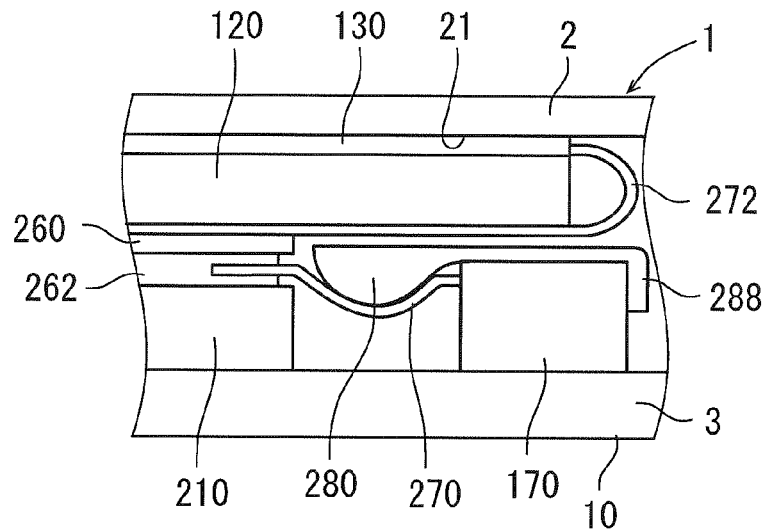
FIG. 12 is a view illustrating an example of a cross-sectional structure in the periphery of a flexible printed wiring board of an electronic apparatus.

FIG. 12 is a cross-sectional view schematically illustrating an example internal configuration of the electronic apparatus 1 by enlarging a portion thereof. The rear imaging unit 170 is disposed on the upper end of the electronic apparatus 1 (see also FIGS. 4 and 5). The printed board 260 is disposed on a lower side of the rear imaging unit 170.

The flexible printed board 270 is electrically connected to the rear imaging unit 170 on one end, extends from the one end, and is electrically connected to the printed board 260 on another end. The flexible printed board 270 is connected to the printed board 260 through a connection portion 262 (for example, through a connector). The flexible printed board 270 extends between the rear imaging unit 170 and the printed board 260 in a state of being curved. Accordingly, even when the distance between the rear imaging unit 170 and the printed board 260 varies in a range of a manufacturing tolerance, the variation in the distance can be allowed by the flexible printed board 270. That is, even when the distance varies, the flexible printed board 270 can appropriately connect the rear imaging unit 170 with the printed board 260 by adjusting the degree of curvature of the flexible printed board 270. When another end of the flexible printed board 270 is connected to the printed board 260, the another end may be directly mounted on the printed board 260 or may be connected to a connector on the printed board 260.

As illustrated in FIG. 12, a concave curved portion of the flexible printed board 270 faces the surface (inner surface 21) of the cover panel 2 through the flexible printed board 272, the display panel 120, and the touch panel 130.

The flexible printed board 270 is curved on the cross section (FIG. 12) perpendicular to the cover panel 2. In FIG. 12, the curve of the flexible printed board 270 is expanded towards the rear surface 10 side.

The gap reduction member 280 is disposed on the cover panel 2 side with respect to the flexible printed board 270. The gap reduction member 280 is in contact with at least a portion of the curved portion of the flexible printed board 270, and occupies a gap between the flexible printed board 270 and the cover panel 2. In the example of FIG. 12, the gap is between the flexible printed boards 270 and 272. The material of the gap reduction member 280 is not limited as long as the material is a solid, an insulation resin or the like.

The gap reduction member 280 is fixed to the electronic apparatus 1. In the example of FIG. 12, the gap reduction member 280 is provided as a part of a holder 288, and the holder 288 is fixed to the electronic apparatus 1 (for example, to the case 3). The holder 288 will be described below.

It is possible to reduce breakage of the cover panel 2 using the gap reduction member 280 as described below. An example of pressing the cover panel 2 (particularly, a portion of the cover panel 2 corresponding to the curved portion of the flexible printed board 270 in a plan view) to the rear surface 10 side is considered. Here, the cover panel 2 is pressed at a position in which the gap reduction member 280 (curved portion of the flexible printed board 270) is disposed in a plan view. In this example, the cover panel 2, the touch panel 130, the display panel 120, and the flexible printed board 272 are approximately integrally displaced to the rear surface 10 side in the pressed portion by the pressing. In addition, when the displacement amount is increased, the flexible printed board 272 is brought into contact with the gap reduction member 280. By this contact, the cover panel 2, the touch panel 130, the display panel 120, and the flexible printed board 272 are supported by the gap reduction member 280. Therefore, a displacement more than the above description is reduced by the gap reduction member 280.

Accordingly, the displacement of the above mentioned components can be reduced compared to a structure in which the gap reduction member 280 is not provided. Further, breakage of the cover panel 2 due to the displacement can be reduced. Therefore, even when the cover panel 2 is a panel having high hardness such as sapphire, diamond, zirconia, titania, crystal, lithium tantalate, or aluminum oxynitride, breakage due to the stress of the cover panel 2 can be reduced.

In FIG. 12, the flexible printed board 270 is expanded to the rear surface 10 side, but may be expanded to the cover panel 2 side in other example embodiments.

<Shape of Gap Reduction Member 280>

In FIG. 12, the gap reduction member 280 has a shape corresponding to an outline of the curved portion of the flexible printed board 270 (for example, an approximately semicircular shape). In this manner, the thickness of the gap reduction member 280 can be increased. Therefore, displacement of a thicker gap reduction member 280 can be decreased compared to a structure having a thin gap reduction member 280. That is, strength of the gap reduction member 280 supporting the cover panel 2 can be improved and the breakage of the cover panel 2 can be more reduced.

In FIG. 12, a component such as a flexible printed board 272 is positioned between the display panel 120 and the gap reduction member 280. The shape of this component is an approximately planar shape. The shape of the gap reduction member 280 in the cover panel 2 side is also an approximately planar shape. That is, the shape of the gap reduction member 280 in the cover panel 2 side corresponds to the shape of the component (for example, the flexible printed board 272) in the gap reduction member 280 side. Since the thickness of the gap reduction member 280 can be increased, the breakage of the cover panel 2 can be further reduced.

<Width of Gap Reduction Member 280>

The width of the flexible printed board 270 and the width of the gap reduction member 280 will be described. The width herein means a width in a direction perpendicular to the extending direction of the flexible printed board 270.

Figure 13:
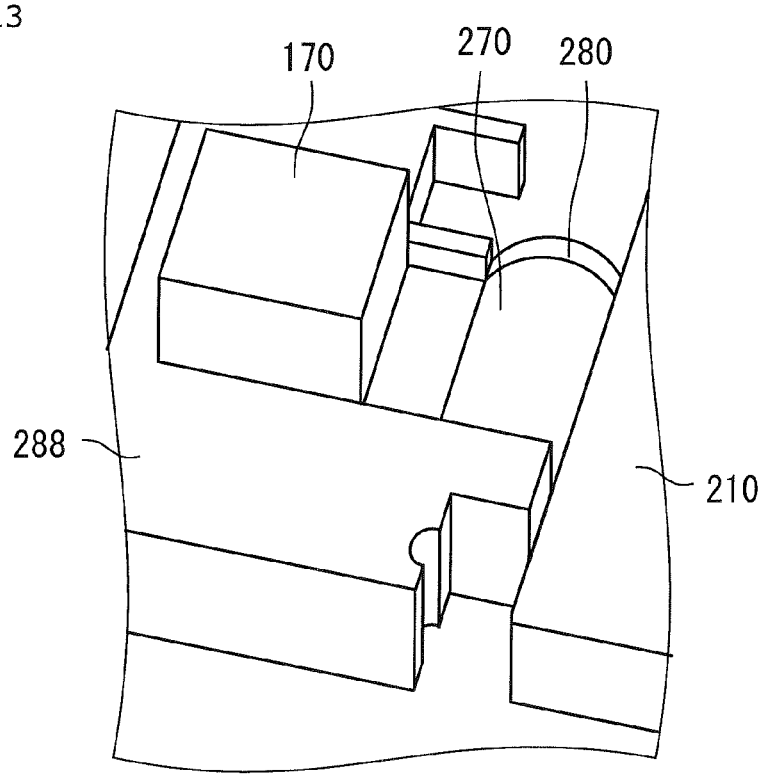
FIG. 13 is a perspective view illustrating and example of a periphery of a flexible printed wiring board of an electronic apparatus.

FIG. 13 is a perspective view schematically illustrating the inside of the electronic apparatus 1, and illustrates the configuration of the electronic apparatus 1 when seen from the rear surface 10 side. In FIG. 13, only the rear imaging unit 170, the flexible printed board 270, the gap reduction member 280, the battery 210, and the holder 288 are illustrated and other members are omitted. For example, in FIG. 13, there is an empty space formed on the obliquely upper right side of the gap reduction member 280, but one or more members are actually disposed in this area. Alternatively, where one or more members cannot be provided, the gap reduction member 280 may extend to the obliquely upper right side so as to fill the space.

The flexible printed board 270 has a band-like shape with a first width and is curved as described above. The gap reduction member 280 in contact with at least a portion of the curved portion extends across the curved portion. That is, the width of the gap reduction member 280 is greater than the first width (the width of the flexible printed board 270) and extends from both sides of the flexible printed board 270.

According to the above, the gap reduction member 280 has a broader region among areas facing the curved portion of the flexible printed board 270. Therefore, it is possible to reduce the gap between the curved portion of the flexible printed board 270 and the cover panel 2. Further, the cover panel 2, the touch panel 130, the display panel 120, and the flexible printed board 272 can be supported by the gap reduction member 280 and the breakage of the cover panel 2 can be further reduced.

The width of the gap reduction member 280 may be the same as that of the flexible printed board 270. That is, both ends (in the width direction) of the gap reduction member 280 may be placed at the same positions as both ends of the flexible printed board 270 in a plan view.

<Holder>

In FIGS. 12 and 13, the gap reduction member 280 is a part of the holder 288 that holds the rear imaging unit 170. The holder 288 is provided for positioning, protecting, and fixing, the rear imaging unit 170. The holder 288 surrounds the vicinity of the rear imaging unit 170 and is in contact with the rear imaging unit 170 from the cover panel 2 side.

In this manner, the gap reduction member 280 can be used not only for the reduction of the gap between the flexible printed board 270 and the cover panel 2, but also for the holder for the rear imaging unit 170. Accordingly, cost reduction and manufacturing efficiency can be realized.

<Second Gap Reduction Member>

Figure 14:
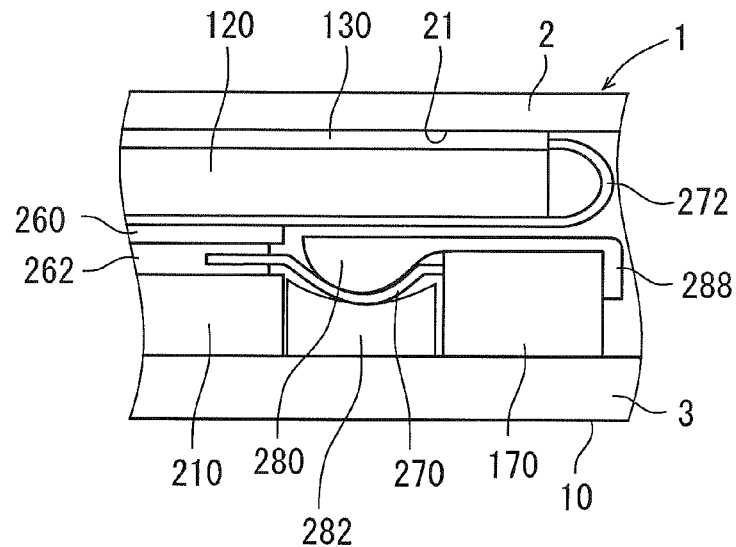
FIG. 14 is a view illustrating an example of a cross-sectional structure in a periphery of a flexible printed wiring board of an electronic apparatus.

FIG. 14 is a cross-sectional view schematically illustrating another example of an enlarged internal configuration of the electronic apparatus 1. The electronic apparatus 1 of FIG. 14 further includes the gap reduction member 282 compared to the electronic apparatus 1 of FIG. 12. The gap reduction member 282 is provided between the rear surface 10 side in the electronic apparatus 1 and the flexible printed board 270, and is in contact with at least a portion of the curved portion of the flexible printed board 270. That is, the flexible printed board 270 is positioned between the gap reduction members 280 and 282. The material of the gap reduction member 282 is not limited as long as the material is a solid, and is a resin made of an insulation material or the like. The gap reduction member 282 is appropriately fixed to the electronic apparatus 1. For example, the gap reduction member 282 is fixed to the case 3. Breakage of the cover panel 2 can be further reduced by the gap reduction member 282 as described below. For example, the gap reduction member 280 is supported by the gap reduction member 282 through the flexible printed board 270 when the cover panel 2 (particularly, a portion of the cover panel 2 at a position corresponding to the position of the curved portion of the flexible printed board 270 in a plan view) is pressed, and the gap reduction member 280 is displaced to the rear surface 10 side due to the cover panel 2 being pressed. Therefore, the displacement of the cover panel 2 can be further reduced and the breakage of the cover panel 2 can be further reduced compared to the structure in which the gap reduction member 282 is not provided.

Moreover, from a viewpoint of reducing the displacement of the cover panel 2, it is desirable that the shape of the gap reduction member 282 in the flexible printed board 270 side be a shape along the curvature of the flexible printed board 270. In addition, it is desirable that the shape of the rear surface 10 in the gap reduction member 282 side correspond to a shape of the gap reduction member 282 in the rear surface 10 side.

Further, from a viewpoint of reducing the displacement of the cover panel 2, it is desirable that the width of the gap reduction member 282 be greater than or equal to the width of the flexible printed board 270. That is, it is desirable that both ends of the gap reduction member 282 correspond to the positions of both ends of the flexible printed board 270, or the positions beyond both ends of the flexible printed board 270. In this manner, the breakage of the cover panel 2 can be further reduced.

The gap reduction member 282 may be formed as part of another member (for example, a holder) as well. For another example, the gap reduction member 282 disposed on the case 3 can be the holder for an antenna which is used for wireless communication. In this manner, the gap reduction member 282 can be produced easily.

Further, in contrast to the example of FIG. 14, in an example where the flexible printed board 270 is curved so as to expand towards the cover panel 2 side, the thickness of the gap reduction member 280 becomes thinner and the supporting strength by the gap reduction member 280 becomes relatively small. Therefore, the gap reduction member 282 is particularly desirable. That is, the gap reduction member 282 is particularly desirable in a structure in which the flexible printed board 270 is curved towards the cover panel 2 side.

In the above-described example, the flexible printed board 270 connects the rear imaging unit 170 to the printed board 260. However, the components to be connected are not limited to the rear imaging unit 170 and the printed board 260. For example, the flexible printed board 270 may connect two arbitrary components (for example, electronic components) accommodated in the electronic apparatus 1, and may be curved and extend in the area facing the cover panel 2. In such a structure, a gap is generated between the curved portion of the flexible printed board 270 and the cover panel 2, and the gap reduction member, which is in contact with at least a portion of the curved portion of the flexible printed board 270 from the cover panel 2 side, fills the gap.

<Third Gap Reduction Member>

Figure 15:
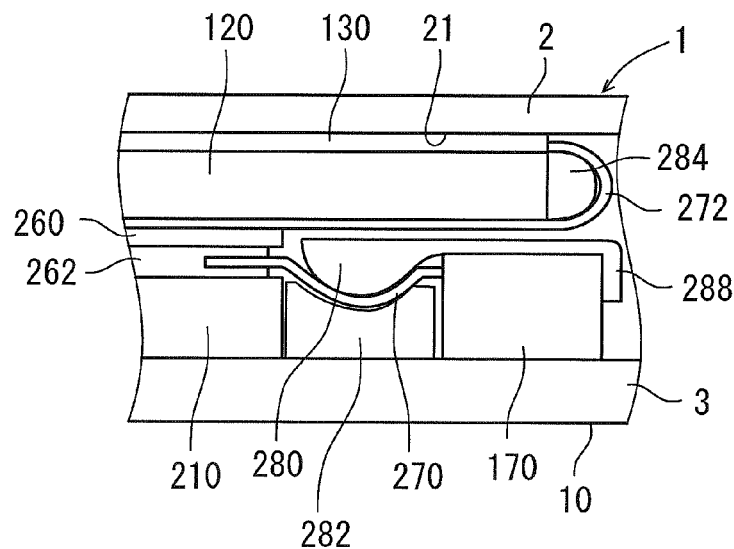
FIG. 15 is a view illustrating an example of a cross-sectional structure in a periphery of a flexible printed wiring board of an electronic apparatus.

FIG. 15 is an enlarged cross-sectional view schematically illustrating another embodiment of the internal structure of the electronic apparatus 1. The electronic apparatus 1 of FIG. 15 further includes a gap reduction member 284 compared to the electronic apparatus 1 of FIG. 14.

In FIG. 14, the flexible printed board 272 connects the display panel 120 or the touch panel 130 (hereinafter, collectively referred to as inner panels) with the printed board 260. The flexible printed board 272 is folded back from an end (for example, an upper end) of the inner panel while being curved and extends from the rear surface side of the inner panel. Accordingly, a space is formed between the curved portion of the flexible printed board 272 and the end of the inner panel. The curved portion of the flexible printed board 272 is positioned in the area facing the surface of the cover panel 2.

The gap reduction member 284 is provided in the space surrounded by the curved portion of the flexible printed board 272 and the end of the panel, and is in contact with at least a portion of the curved portion of the flexible printed board 272. The material of the gap reduction member 284 is not limited as long as the material is a solid. For example, a resin made of an insulation material and the like can be used. The gap reduction member 284 is fixed to, for example, the printed board 260 or the case 3 of the electronic apparatus 1 (that is, to components other than the cover panel 2 and the inner panel).

It is possible to reduce breakage of the cover panel 2 using the gap reduction member 284 as described below. An example of pressing the cover panel 2 to the rear surface 10 side is considered. In this example, the cover panel 2 is pressed at a position corresponding to a position in which the gap reduction member 284 is provided in a plan view, and the cover panel 2 is displaced towards the rear surface 10 side in the pressed portion. The cover panel 2 is supported by the gap reduction member 284 as it is brought into contact with the gap reduction member 284 through a portion of the flexible printed board 272. Accordingly, displacement is reduced by the gap reduction member 284. Therefore, displacement of the cover panel 2 can be reduced when compared to the structure in which the gap reduction member 284 is not provided. Further, the breakage of the cover panel 2 due to the displacement can be reduced.

In addition, it is desirable that the gap reduction member 284 extend beyond both sides of the flexible printed board 272 (in a direction perpendicular to the extending direction of the flexible printed board 272). In this manner, the displacement of the cover panel 2 can be reduced.

The gap reduction member 284 may be a part of another member, for example, a holder.

<Fourth Gap Reduction Member>

Figure 16:
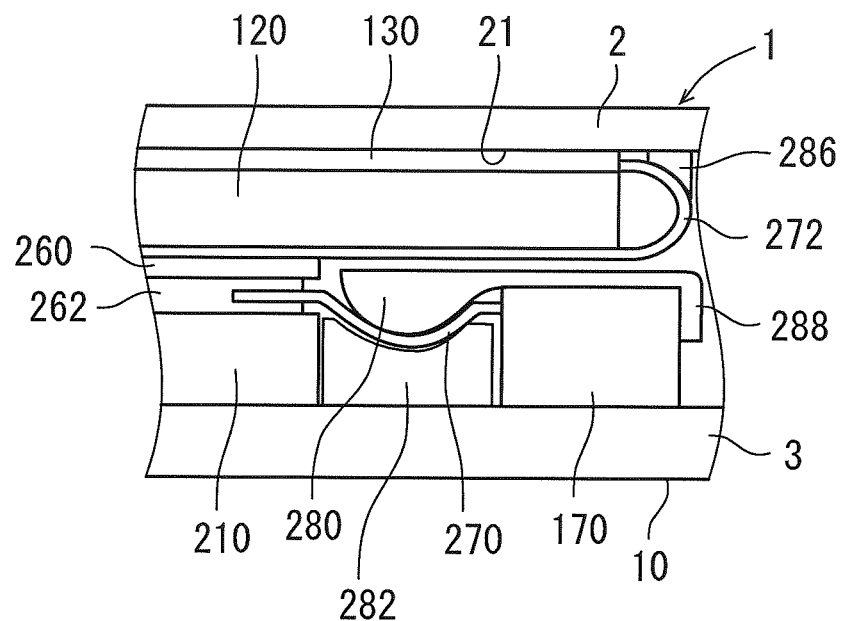
FIG. 16 is a view illustrating an example of a cross-sectional structure in a periphery of a flexible printed wiring board of an electronic apparatus.

In the example of FIG. 16, a gap reduction member 286 which is in contact with the curved portion of the flexible printed board 272 from the cover panel 2 side is provided. The gap reduction member 286 is fixed to the electronic apparatus 1, for example, to the case 3, or a member other than the cover panel 2. Since the cover panel 2 can be supported by the gap reduction member 286, the breakage of the cover panel 2 can be reduces, particularly, breakage which may be generated when a portion of the cover panel 2 corresponding to the curved portion of the flexible printed board 272 in a plan view is strongly pressed.

The efficiency regarding the shape and the width of the gap reduction member 286 is similar to the embodiments discussed above for the first, second and third gap reduction members. In addition, the gap reduction member 286 may provide an additional us in the electrical apparatus 1.

In the above-described example, a flexible printed board is adopted as a connecting tool that connects two components (for example, electronic components). However, the flexible printed board is not necessarily adopted, and a cable in which a single wire or a plurality of core wires are bundled may be adopted. A flexible wiring board is an example of the cable.

A portion on the rear surface 10 side (particularly, a portion corresponding to the curved portion of the flexible printed board 270 in a plan view) in the case 3 may be formed by containing high-hardness materials having high hardness (for example, sapphire, diamond, zirconia, titania, crystal, lithium tantalate, and aluminum oxynitride). In this case, the gap reduction member 282 which is in contact with the curved portion of the flexible printed board 270 from the rear surface 10 side and is fixed to the inside of the electronic apparatus 1 (see FIG. 14) is useful. Accordingly, the breakage of the portion of the case 3 in the rear surface 10 side can be reduced. In this case, if the gap reduction member 280 is also provided as well as the gap reduction member 282, the breakage thereof can be reduced.

The above-described examples are applied to a mobile phone. However, the example cover panels 2 and gap reduction members can be applied to an electronic apparatus other than a mobile phone such as a smart phone, a tablet terminal and a wearable type electronic apparatus mounting on an arm, digital books, digital cameras, electronic game machines, digital music players, personal digital assistance (PDA), personal handy phone system (PHS), lap top computers, portable TV's, Global Positioning Systems (GPS's) or navigation systems, machining tools, pedometers, health equipment such as weight scales, display monitors, wristwatch, and the like.

As described above, the electronic apparatus 1 has been described in detail, but the above description is merely an example in every aspect and the present invention is not particularly limited thereto. Further, various modifications described above can be applied in combination as long as they do not contradict each other. In addition, it is understood that numerous modifications which are not exemplified above can be assumed without departing the scope of the present invention.

What is claimed is:

1. An electronic apparatus, comprising:
   a case;
   a sapphire panel disposed in the case and including an outer surface facing outwards from the case and an inner surface;
   a cable disposed in the case at the inner surface, the cable including a curved portion; and
   a first gap reduction member disposed between the curved portion of the cable and the sapphire panel, and that is in contact with at least a first side of the curved portion of the cable.

2. The electronic apparatus according to claim 1, wherein the gap reduction member has a shape corresponding to an outline of the curved portion of the cable.

3. The electronic apparatus according to claim 1, further comprising a second gap reduction member that is in contact with at least a second side of the curved portion of the cable that is opposite the first side.

4. The electronic apparatus according to claim 3, wherein the second gap reduction member has a shape that corresponds to an outline of the second side of the curved portion of the cable.

5. The electronic apparatus according to claim 1, wherein the gap reduction member is a part of a holder for an electronic component.

6. The electronic apparatus according to claim 1, wherein the cable is a flexible printed wiring board, and
   a width of the gap reduction member is greater than or equal to a width of the flexible printed wiring board.

7. The electronic apparatus according to claim 1, wherein the first gap reduction member is one of a plurality of gap reduction members, wherein each gap reduction member of the plurality of gap reduction members is disposed in a gap area created by adjacent components in the case.

8. The electronic apparatus according to claim 1, wherein the curved portion is concave with respect to the sapphire panel.

9. The electronic apparatus according to claim 1, wherein the curved portion is convex with respect to the sapphire panel.

10. An electronic apparatus, comprising:
    a case
    a sapphire panel disposed in the case;
    an internal panel facing the sapphire panel;
    a cable connected to an end portion of the internal panel, folded back from the end portion to form a curved portion of the cable, and extending along the internal panel at a rear surface side; and
    a gap reduction member disposed in a space surrounded by the end portion of the internal panel and the curved portion of the cable and being in contact with at least a portion of the curved portion of the cable.

11. The electronic apparatus according to claim 10, further comprising:
    a flexible printed wiring board comprising a curved portion; and
    a first curved portion gap reduction member disposed between the curved portion of the flexible printed wiring board and the sapphire panel.

12. The electronic apparatus according to claim 11, further comprising a second curved portion gap reduction member disposed between the curved portion of the flexible printed wiring board and the case.

13. The electronic apparatus according to claim 10, wherein the curved portion is concave with respect to the sapphire panel.

14. The electronic apparatus according to claim 10, wherein the curved portion is convex with respect to the sapphire panel.

15. The electronic apparatus according to claim 10, wherein the gap reduction member is part of a holder for securing a component to the case.

16. An electronic apparatus, comprising:
    a case;
    a sapphire panel disposed in the case, the sapphire panel comprising an outer surface facing outwards from the case, and an inner surface;
    at least one flexible component disposed in the case; and
    a first gap reduction member disposed between at least a portion of the at least one flexible component and the sapphire panel to provide support for the sapphire panel when a force is applied to the outer surface.

17. The electronic apparatus according to claim 16, further comprising a second gap reduction member disposed between at least another portion of the at least one flexible component and the case.

18. The electronic apparatus according to claim 16, wherein the first gap reduction member is a part of a holder for supporting additional components in the case.

19. The electronic apparatus according to claim 16, wherein the at least one flexible component comprises an expandable curved portion, and wherein the first gap reduction member is in contact with the expandable curved portion.

20. The electronic apparatus according to claim 19, further a second gap reduction member disposed between the expandable curved portion and a rear inside surface of the case.

* * * * *